(12) United States Patent
Radestock

(10) Patent No.: US 7,185,235 B2
(45) Date of Patent: Feb. 27, 2007

(54) TEST AND VERIFICATION FRAMEWORK

(75) Inventor: Guenter Radestock, Karlsruhe (DE)

(73) Assignee: SAP AG, Walldorf (DE)

( * ) Notice: Subject to any disclaimer, the term of this patent is extended or adjusted under 35 U.S.C. 154(b) by 530 days.

(21) Appl. No.: 10/306,797

(22) Filed: Nov. 27, 2002

(65) Prior Publication Data

US 2003/0126521 A1 Jul. 3, 2003

Related U.S. Application Data

(60) Provisional application No. 60/346,409, filed on Dec. 28, 2001.

(51) Int. Cl.
*G06F 11/00* (2006.01)
(52) U.S. Cl. .................. 714/47; 714/4; 714/48
(58) Field of Classification Search ............ 714/28–33, 714/47; 709/223, 224; 717/124
See application file for complete search history.

(56) References Cited

U.S. PATENT DOCUMENTS

| | | | |
|---|---|---|---|
| 5,600,789 A | 2/1997 | Parker et al. | |
| 5,903,278 A * | 5/1999 | Mitchell et al. | 345/589 |
| 5,991,897 A | 11/1999 | Perugini et al. | |
| 6,002,868 A | 12/1999 | Jenkins et al. | |
| 6,167,534 A * | 12/2000 | Straathof et al. | 714/38 |
| 6,202,199 B1 * | 3/2001 | Wygodny et al. | 717/125 |
| 6,463,552 B1 | 10/2002 | Jibbe | |
| 6,567,924 B1 * | 5/2003 | McGee et al. | 713/502 |
| 6,823,460 B1 * | 11/2004 | Hollander et al. | 713/200 |
| 2001/0005863 A1 * | 6/2001 | Schreier et al. | 709/311 |

* cited by examiner

*Primary Examiner*—Robert Beausoliel
*Assistant Examiner*—Emerson Puente
(74) *Attorney, Agent, or Firm*—Mintz, Levin, Cohn, Ferris, Glovsky and Popeo, P.C.

(57) ABSTRACT

Systems and techniques to test a software product in one or more computer systems. In general, in one implementation, the technique includes calling components in a first computer system during execution of a test, recording the calls, and rerunning the recorded calls in a second computer system in order to recreate the behavior of the first computer system during execution of the test.

16 Claims, 3 Drawing Sheets

TEST AND VERIFICATION FRAMEWORK

CROSS REFERENCE TO RELATED APPLICATIONS

This application claims the benefit of priority from U.S. Provisional Application entitled "TEST AND VERIFICATION FRAMEWORK", filed Dec. 28, 2001, application Ser. No. 60/346,409, the disclosure of which is incorporated by reference.

BACKGROUND

The following description relates to systems and techniques relating to diagnostic tools for computer systems, for example, a test and verification framework.

Developers of a software product may first write code for the product, compile the code, and then test and debug problems found in the code. The product may then be finalized and offered to customers.

The product may require further testing after it has been finalized. Additional testing may be needed for several reasons. Certain problems may not have been detected during test and debug at the developer's site. New problems may arise as a result of bug fixes and added functionality. Problems also may arise as the software product interacts with other applications installed in the same computer system in which the product is installed.

The computing environment in which the product operates in the developer computer system may be different from the environment in which the product operates in the customer computer system. For example, the developer computer system may include only the product, low level APIs, and the test layer, whereas the customer computer system may include many interfaced components, e.g., applications 160 and databases, not in the developer system. The differences in computing environment may affect the behavior of the product during a test. One approach is to install a system identical to that of the customer's at the developer site in order to recreate the environment in which the product is working. However, this may be a time consuming and involved task.

SUMMARY

The present application teaches a test and verification framework for a computer system.

In one aspect, a computer system may include an application layer, an Application Programming Interface (API) layer, and a test layer. The application layer may include a software product to be tested. Components in the API layer and the test layer may include a trace feature that is switched on when a test is initiated. The trace feature may write a script, e.g., a Python script, to a trace file each time a component is called. The script written to the trace file is a command which would call the component that wrote it.

The test may be performed in a first computer system, e.g., a customer system. The trace file may then be sent to a second system, e.g., a developer system. The scripts in the trace file may be rerun the second system, thereby recreating the behavior of the first computer system during the test. Results obtained in the different systems may then be compared.

The systems and techniques described here may provide one or more of the following advantages. The trace file may enable developers to recreate the behavior of a software product in a customer system without recreating the customer system. A common test and verification framework may also enable a development support team to help the developers improve a software product. Furthermore, tests can be stored as scripts that can be started automatically on a regular basis to find side effects of software changes as quickly as possible.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The systems and techniques described here relate to test and verification frameworks for testing and verifying software products in computer systems.

Developers of a software product may first write code for the product, compile the code, and then test and debug problems found in the code. The product may then be finalized and offered to customers.

The product may require further testing after it has been finalized. Additional testing may be needed for several reasons. Certain problems may not have been detected during test and debug at the developer site. New problems may arise as a result of bug fixes and added functionality. Problems may also arise as the software product interacts with other applications in the computer system in which the product is installed.

Figure 1:
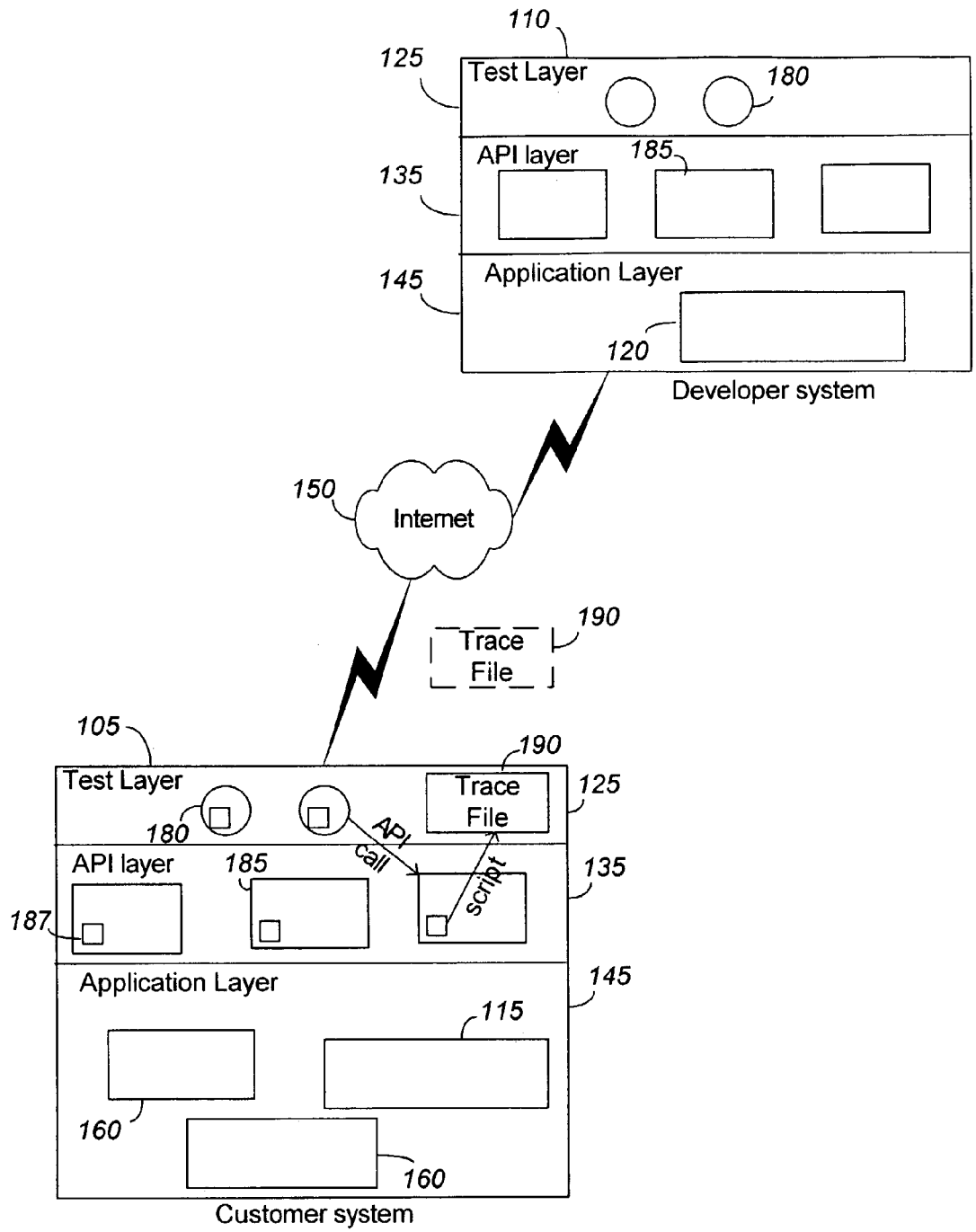
FIG. 1 shows a block diagram of computer systems at developer and customer sites that implement a test and verification framework.

A test and verification framework may be used by the developers of a software product to test the product installed at a customer site. FIG. 1 illustrates a computer system 105 at a customer site and computer system 110 at a developer site. The product 120 installed on the developer system 110 may be the same version or a newer version of the product 115 installed on the customer system 105.

The computer systems 105 and 110 may include several software layers. Each system may include an application layer 125, an API (Application Programming Interface) layer 135, and a test layer 145. The application layer 125 may include software applications 160 in addition to the software product to be tested. The additional applications 160 may include COTS (commercial off-the-shelf) and customized software products. The API layer 135 may be implemented above the application layer and provides an interface between the different applications in the application layer. The test layer 145 may be implemented above the API layer. The test layer includes components which may be used to test the interoperability and performance of the product in the system during installation and subsequent debugging operations.

An API is a set of rules for writing function or subroutine calls that access functions in a library. Programs that use these rules or functions in their API calls can communicate with others that use the API, regardless of the other program's specifics. APIs work with a wide spectrum of application dialogues (i.e., interprogram communication schemes) to facilitate information exchange. These may include database access, client/server, peer-to-peer, real-time, event-driven, store and forward, and transaction processing. To invoke an API, a program calls a SEND-type function, specifying parameters for destination name, pointers to the data, and return confirmation options. The API takes the data and performs the communications-specific work in a manner which is transparent to the application.

Figure 2:
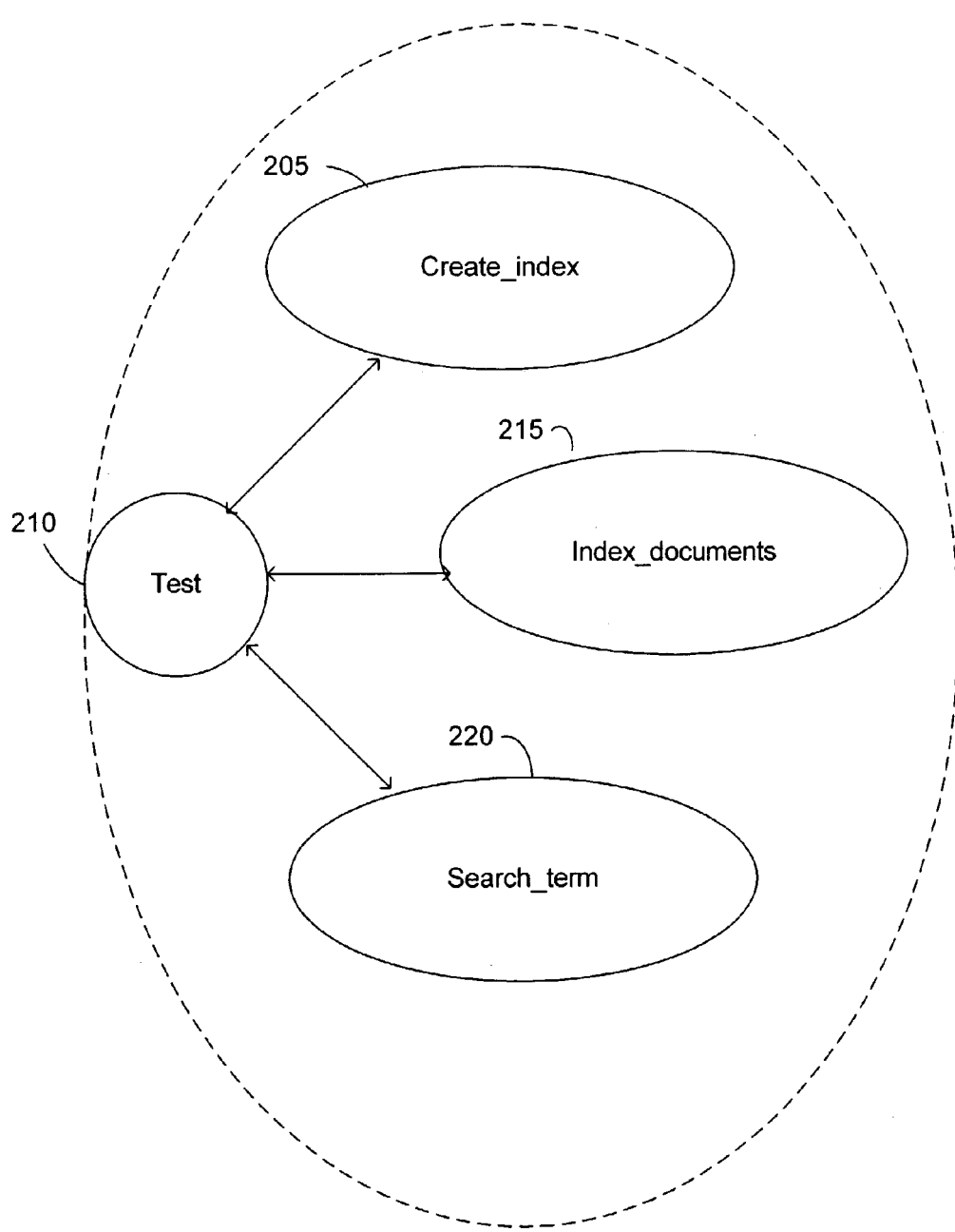
FIG. 2 shows a block diagram illustrating a test hierarchy in the test and verification framework.

The test layer 145 may include a library of tests. The test and verification framework may utilize a test hierarchy that includes "atomic" tests and larger tests, as shown in FIG. 2. The atomic tests may use a limited number of API calls per test and can have many parameters. The larger tests can call atomic tests and other tests at the test layer, or call API functions implemented in the API layer. For example, in an information retrieval system, a certain atomic test 205 may create an index of documents. A larger test 210 may call this test 205 and other atomic tests 215 and 220, respectively, to (1) create an index, (2) index a few documents, and (3) perform searches to check the results.

The larger tests may include "complete" tests, which run many smaller tests. A complete test may be run when changes are made to the software product or when a problem in the installation of the software product is suspected. Complete tests may also be used to check older versions of the product for problems detected in the current version and keep "known problem" lists up to date.

The tests may be written in a scripting language, such as Python, Perl, Rexx, Tcl, Visual Basic, or Jython (an implementation of Python integrated with the Java platform). A scripting language is a relatively simple programming language used to write scripts. A script is a series of commands that are executed by a program called an interpreter. Each time the interpreter executes a script, the interpreter converts each script command into a series of operations and functions which may be executed by a processor, and then causes the processor to execute the series of operations and functions. Since the script must be interpreted each time the script is executed, scripts tend to execute more slowly than compiled programs. However, if a script is modified, the change will be effected the next time the interpreter executes the script. With a compiled program, the program would have to be recompiled before the change would take effect. As a result, scripts tend to be easier and quicker to modify than compiled programs.

Components in the test layer (tests 180) and the API layer (APIs 185) may be written in, or ported to, the scripting language so that the components can be implemented in the scripting language. In some systems, Python, or some implementation of Python, may be a good choice because Python is relatively easy to integrate with popular programming languages such as C, C++, and Java. Also, Python is well suited for rapid prototyping (e.g., the fast and efficient creation test scripts) due to its interpreted, object-oriented nature and extensive module library.

The computing environment in which the product 120 operates in the developer system 110 may be different from the environment in which the product 115 operates in the customer system 105. For example, the developer system may only include the product, low level APIs, and the test layer. The customer system 105 may include many interfaced components, e.g., applications 160 and databases, not in the developer system. The differences in computing environment may affect the behavior of the product during a test. One approach is to install at the developer site a system identical to that of the customer's system in order to recreate the environment in which the product is working. However, this may be a time consuming and involved task. Rather than recreate the structure of the customer system to test it, the behavior of the customer system may be recorded and rerun at the developer site.

Figure 3:
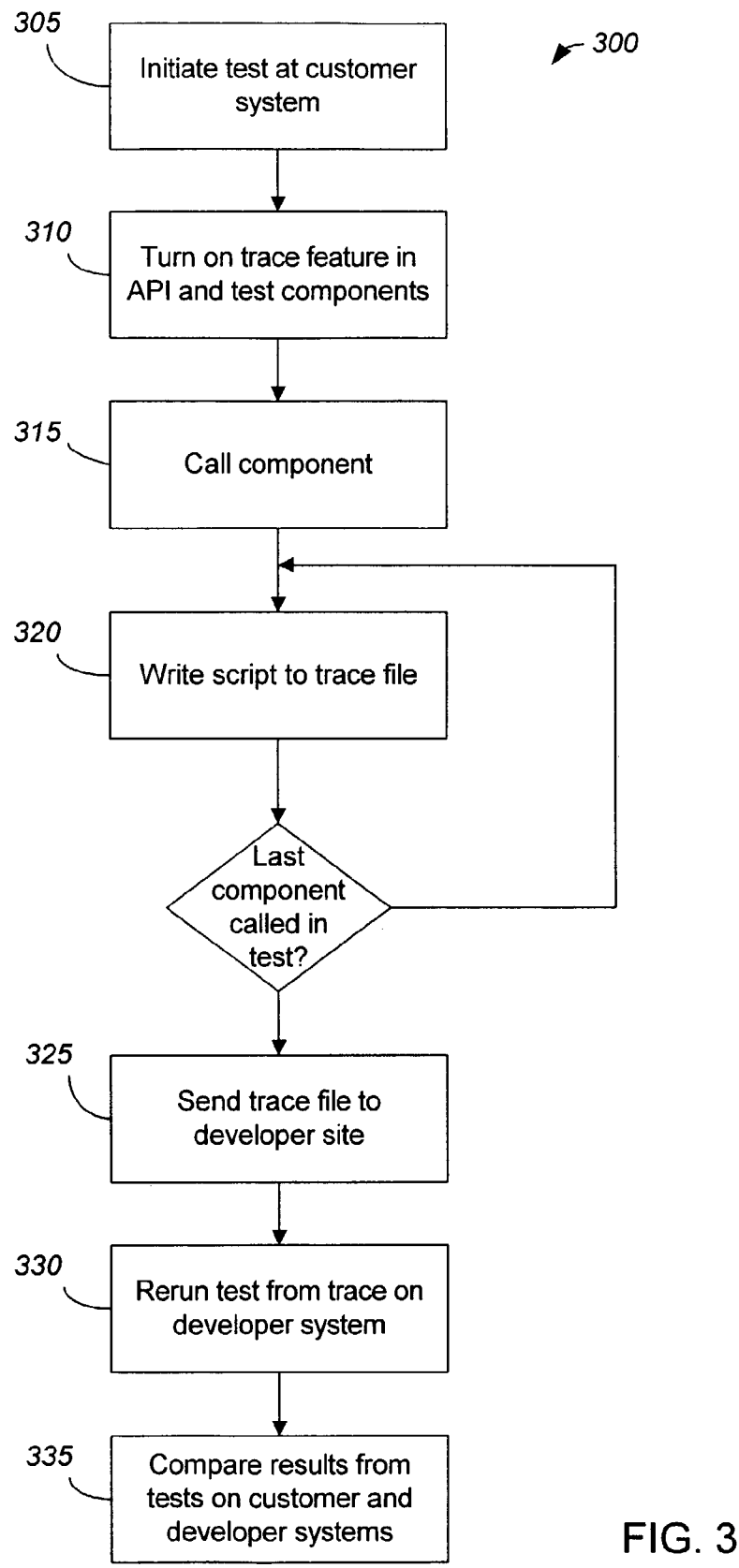
FIG. 3 is a flowchart showing a process for testing a software product utilizing the test and verification framework.

FIG. 3 is a flowchart depicting an example of a testing operation 300 implemented in the test and verification framework. The user of the customer system 105 may initiate a test (block 305). During the test, many components in the API layer 135 and the test layer 145 may be called. Components in the test layer and the API layer may include a trace feature 187. When the user initiates the test, the trace feature is activated (block 310). Each time a component is called (block 315), the trace feature in that component writes a script to a trace file 190 (block 320). The script written to the trace file is a command which would run the component that wrote it. As components are called during the test, scripts are written sequentially to the trace file. The scripts in the trace file 190 form a trace that records the behavior of the customer system 105 during the test.

The trace file 190 may be sent to the developer site (block 325), e.g., over the Internet 150. The trace may then be rerun on the developer system 110 (block 330). The scripts in the trace call the same components that were called in the customer system 105 when the test was run on the customer system. The results of the test at the developer system can be used to determine any problems relating to the product at the customer site. For example, the results of the test performed by the customer system can be compared with the results obtained at the developer system (block 335).

Changes in the software products, e.g., due to bug fixes or integration with a larger system, may cause new problems to arise. Finding bugs late can be expensive because it may be hard to associate the bug with the change that caused it. The test and verification framework may be used to ensure that such errors do not go unnoticed. Tests can be stored as scripts that can be started automatically on a regular basis to find side effects of software changes as quickly as possible.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible. Portions of this disclosure discuss implementing the test and verification framework using the Python scripting language, however other scripting, or non-scripting, languages may be suitable. The logic flow depicted in FIG. 3 does not require the particular order shown, or all steps be performed, to achieve desirable results. For example, the results from the two systems may not be compared, and problems may be determined from the behavior of the developer system during execution of the scripts. In certain implementations, multitasking and parallel processing may be preferable.

Other embodiments may be within the scope of the following claims.

What is claimed is:

1. A method for performing a test comprising:
   calling at least one of a plurality of components in a first computer system during execution of a test, each of said components configured with a trace feature that when called enables writing to a trace file during the test;
   for each of said at least one of the plurality of components called, writing a command associated with said component to the trace file, the command being operative to call said component when executed;
   executing the commands in the trace file at a second computer system;
   calling said at least one of the plurality of components in the second computer system;
   obtaining a first result from executing the test on the first computer system;
   obtaining a second result from calling the plurality of components in the second computer system; and
   comparing the first result and the second result.

2. The method of claim 1, wherein said plurality of components comprise components in an Application Programming Interface (API) layer.

3. The method of claim 1, wherein said plurality of components comprise at least one component in the test layer.

4. The method of claim 1, wherein said writing a command comprises writing a script to the trace file.

5. A system comprising:
   a trace file;
   a plurality of Application Programming Interface (API) components residing on a first computer system and a second computer system, at least one API component including a trace feature operative to write a command comprising a script to the trace file when the API component is called during a test;
   a plurality of test component residing on the first computer system and the second computer system, at least one test component including a trace feature operative to write a command comprising a script to the trace file when the test component is called during the test; and
   a comparison unit operative to obtain a first result from executing the test on the first computer system, obtain a second result from an execution of the scripts in the trace file in the second computer system, and compare the first result and the second results.

6. The system of claim 5, wherein the command is operative to call the component associated with the trace feature that wrote the command.

7. An article comprising a machine-readable medium storing instructions operable to cause one or more machines to perform operations comprising:
   calling at least one of a plurality of components in a first computer system during execution of a test, each of said components configured with a trace feature that when called enables writing to a trace file during the test:
   for each of said at least one of the plurality of components called, writing a command associated with said component to the trace file, the command being operative to call said component when executed;
   executing the commands in the trace file at a second computer system;
   calling said at least one of the plurality of components in the second computer system;
   obtaining a first result from executing the test on the first computer system;
   obtaining a second result from calling the plurality of components in the second computer system; and
   comparing the first result and the second result.

8. The article of claim 7, wherein said components comprise components in an Application Programming Interface (API) layer.

9. The article of claim 7, wherein said components comprise components in a test layer.

10. The article of claim 7, wherein said writing comprises recording said calls as a script to a trace file in response to one of the components being called.

11. The article of claim 10, wherein the script comprises a command operative to call said one of the components when executed.

12. The article of claim 11, wherein said executing comprises rerunning the recorded calls by executing scripts in the trace file.

13. A method comprising:
   initiating a first test on a software product in a first computer system;
   calling Application Programming Interface (API) components, each of said API components configured with a trace feature that when called enables writing to a trace file;
   writing a script to the trace file for at least one API component called during the test, the script being operative to call a corresponding component when executed;

obtaining a first result from the first test;

executing the scripts in the trace file to initiate a second test on a software product in a second computer system;

obtaining a second result from the second test; and comparing the first and second results;

wherein the first computer system is separate and distinct from the second computer system.

14. The method of claim 13, wherein the scripts comprise Python scripts.

15. An apparatus comprising:

means for calling a plurality of components in a first computer system during execution of a test, each of said components configured with a trace feature that when called enables writing to a trace file during the test;

means for writing a command associated with said component command to the trace file for each of at least one of the plurality of components, the command being operative to call said component when executed;

means for executing the commands in the trace file at a second computer system;

means for calling said at least one of the plurality of components in the second computer system;

means for obtaining a first result from executing the test on the first computer system;

means for obtaining a second result from calling the plurality of components in the second computer system; and means for comparing the first result and the second result.

16. An apparatus comprising:

means for initiating a test on a software product in a first computer system;

means for calling Application Programming Interface (API) components, each of said API components configured with a trace feature that when called enables writing to a trace file during the test;

means for writing a script to the trace file for at least one API component called during the test, the script being operative to call a corresponding component when executed;

means for obtaining a result from the test;

means for executing the scripts in the trace file in a second computer system;

means for obtaining a result from executing the scripts in the second computer system; and means for comparing the results obtained in the first computer system to the results obtained in the second computer system.

* * * * *